(12) United States Patent
Kubo

(10) Patent No.: US 11,412,192 B2
(45) Date of Patent: Aug. 9, 2022

(54) PROJECTOR, PROJECTOR CONTROL METHOD, AND IMAGE SYSTEM

(71) Applicant: Sony Corporation, Tokyo (JP)

(72) Inventor: Motoki Kubo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/045,365

(22) PCT Filed: May 15, 2019

(86) PCT No.: PCT/JP2019/019223
§ 371 (c)(1),
(2) Date: Oct. 5, 2020

(87) PCT Pub. No.: WO2019/230386
PCT Pub. Date: Dec. 5, 2019

(65) Prior Publication Data
US 2021/0168337 A1 Jun. 3, 2021

(30) Foreign Application Priority Data
May 29, 2018 (JP) .............................. JP2018-102080

(51) Int. Cl.
*H04N 9/31* (2006.01)
*G09G 3/34* (2006.01)
(52) U.S. Cl.
CPC .............. *H04N 9/312* (2013.01); *G09G 3/34* (2013.01); *G09G 2354/00* (2013.01); *G09G 2370/02* (2013.01)

(58) Field of Classification Search
CPC .... H04N 9/312; H04N 21/414; H04N 21/485; H04N 21/42204; G09G 3/34;
(Continued)

(56) References Cited

U.S. PATENT DOCUMENTS 8,604,938 B2 * 12/2013 Feldstein ........... H04N 21/4131
340/654
10,958,457 B1 * 3/2021 Davis ................. G06Q 10/1095
(Continued)

FOREIGN PATENT DOCUMENTS

JP 2002-149140 A 5/2002
JP 2005-175625 A 6/2005
(Continued)

OTHER PUBLICATIONS

International Search Report dated Aug. 6, 2019 in PCT/JP2019/019223 filed May 15, 2019, 2 pages

*Primary Examiner* — Michael Lee
(74) *Attorney, Agent, or Firm* — Oblon, McClelland, Maier & Neustadt, L.L.P.

(57) ABSTRACT

The present technology relates to a projector, a control method thereof, and an image system that make it possible to easily control operation performed by a projector.
The projector includes a display control section which acquires display data including equipment control information that controls equipment, and which controls another equipment according to the equipment control information. The present technology is applicable, for example, to a projector that is to be connected to another equipment through a network.

13 Claims, 10 Drawing Sheets

(58) Field of Classification Search
CPC ............ G09G 2354/00; G09G 2370/02; H04L 67/125; H04L 67/141; H04L 67/025; G03B 21/14; G06F 13/385
USPC .......................................................... 348/744
See application file for complete search history.

(56) References Cited

U.S. PATENT DOCUMENTS

| | | | |
|---|---|---|---|
| 2002/0175915 A1* | 11/2002 | Lichtfuss ............... | G03B 21/26 345/440 |
| 2005/0123109 A1 | 6/2005 | Yamagishi et al. | |
| 2006/0221302 A1* | 10/2006 | Paige ..................... | G03B 31/00 352/40 |
| 2011/0102301 A1* | 5/2011 | Jeon ..................... | G03B 21/006 345/3.1 |
| 2013/0083922 A1 | 4/2013 | Kanda | |
| 2019/0018381 A1* | 1/2019 | Grodum ............... | G05B 19/042 |

FOREIGN PATENT DOCUMENTS

| | | |
|---|---|---|
| JP | 2010-231610 A | 10/2010 |
| JP | 2013-081007 A | 5/2013 |
| JP | 2016-024309 A | 2/2016 |
| JP | 2016-032205 A | 3/2016 |
| JP | 2017-016133 A | 1/2017 |

* cited by examiner

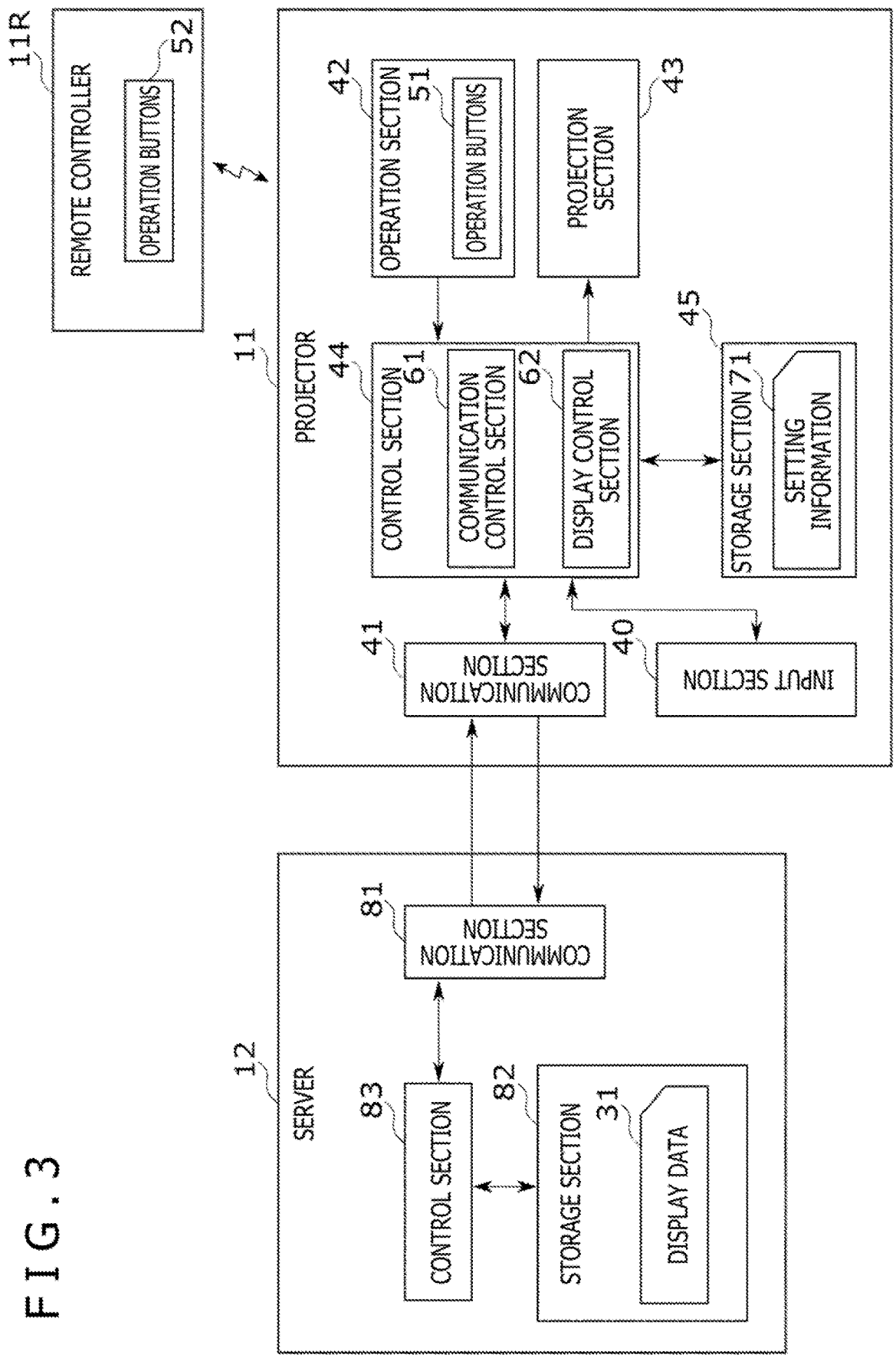

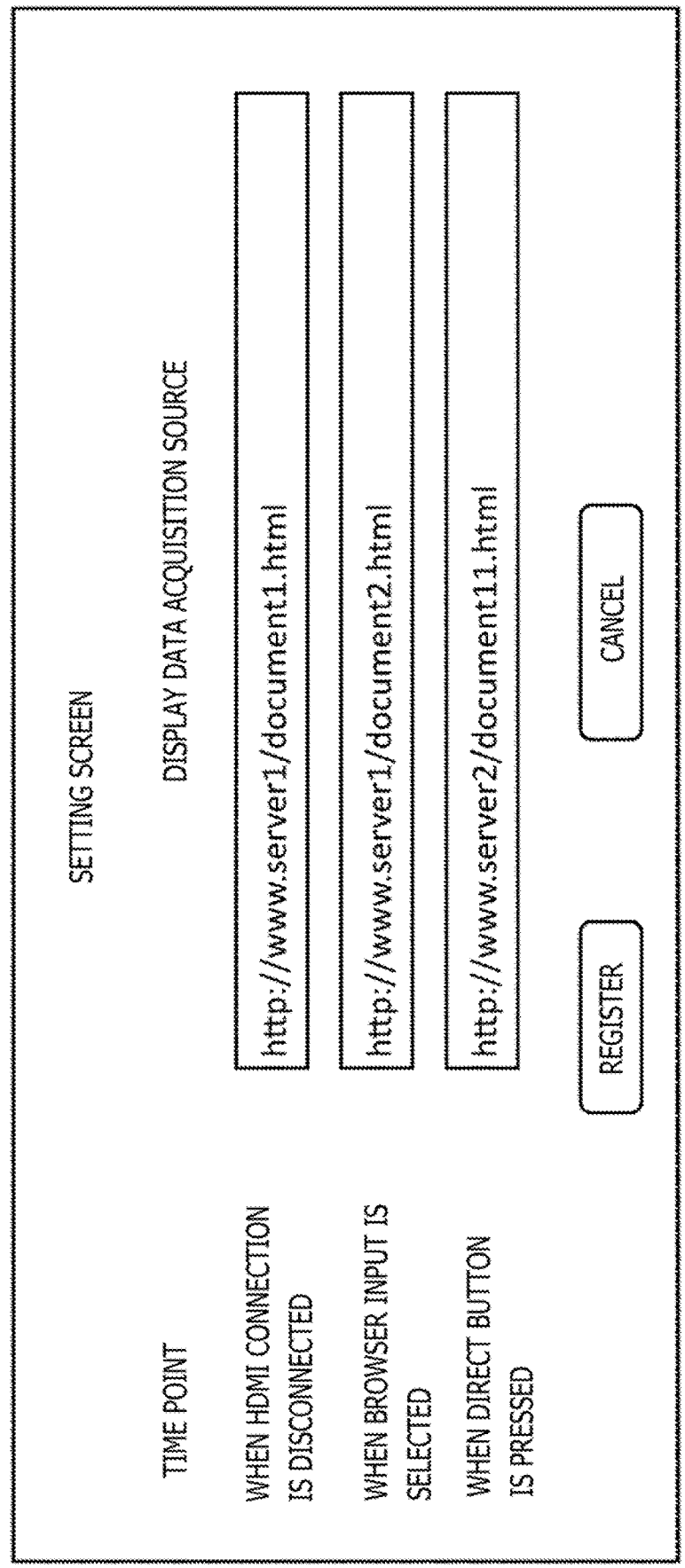

FIG. 5

```
<!DOCTYPE html>
<html>
<head>
<meta charset="utf-8">
</head>
<body>
<img src="image.png">          ⎫ IMAGE DISPLAY
                                 CONTROL INFORMATION
<script type="text/javascript">
function control_other_system(){
    //Power-ON CONTROL OF ANOTHER EQUIPMENT
    var xhr = new XMLHttpRequest();
    xhr.onload = function() {
        var resp = xhr.responseText;
    }
    xhr.open('POST', 'othersystem_url/command/power_on');
    xhr.send(JSON.stringify({ method: "power", version: '1.0', params: "on" }));
}
</script>                      ⎫ EQUIPMENT CONTROL
                                 INFORMATION
</body></html>
```

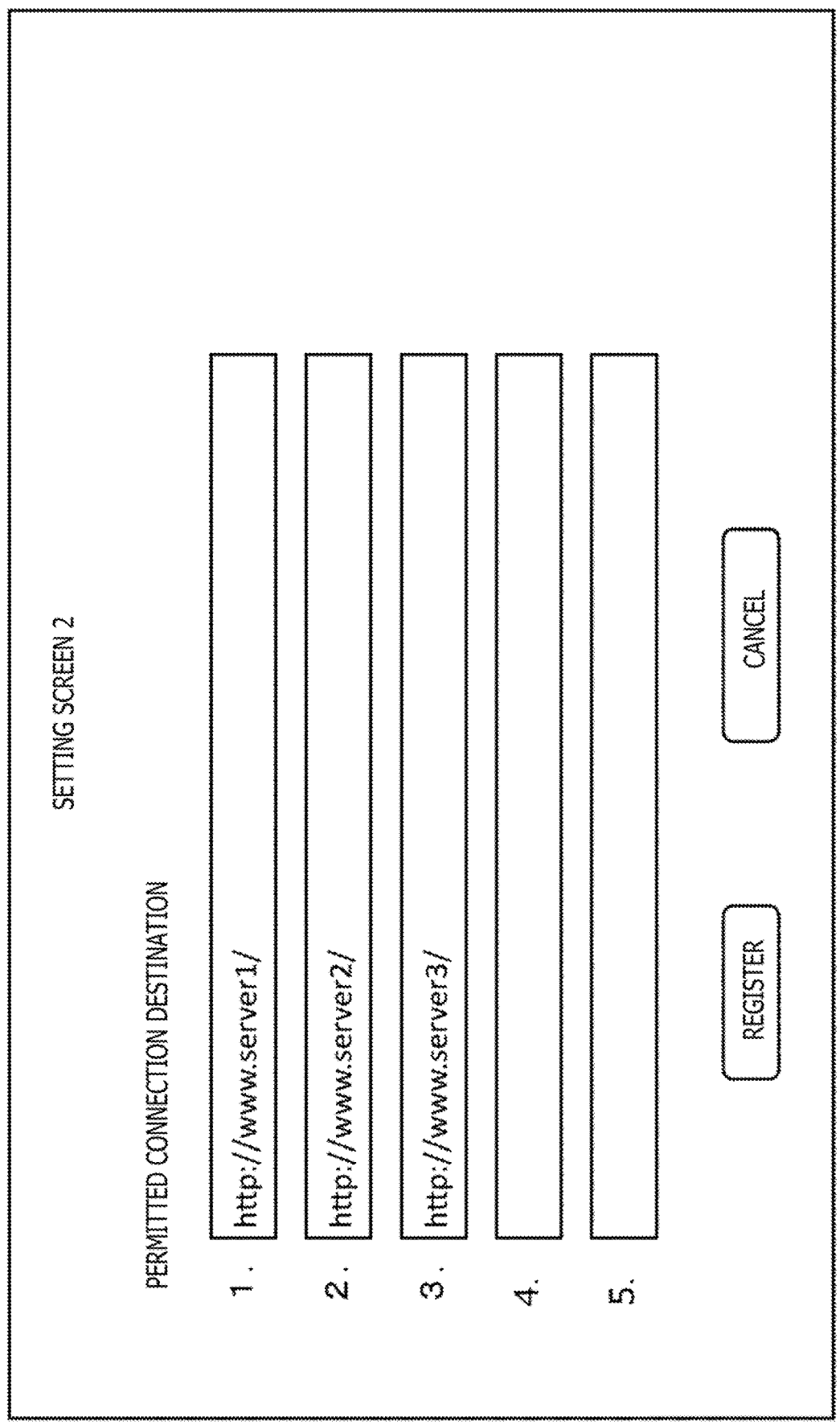

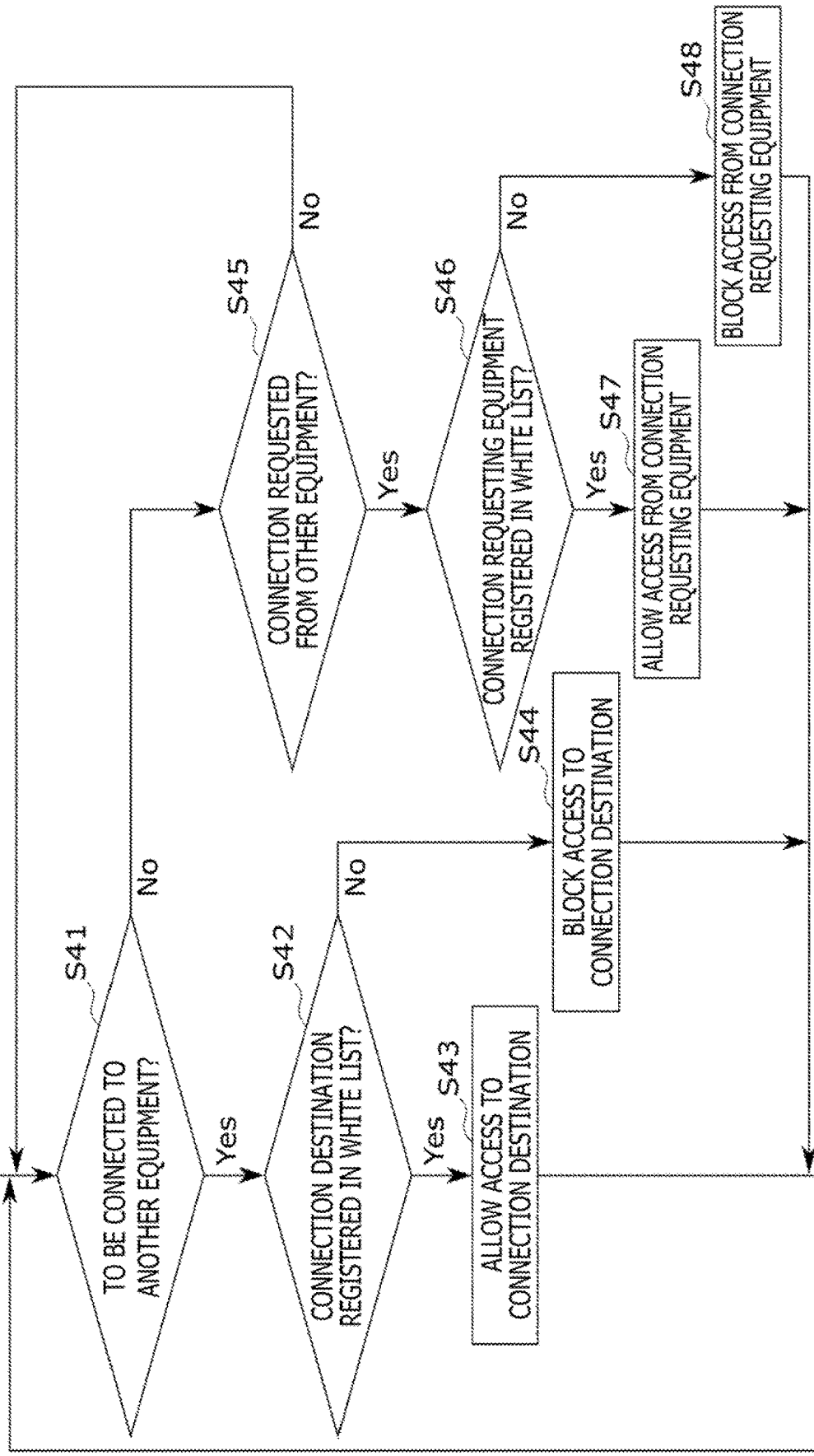

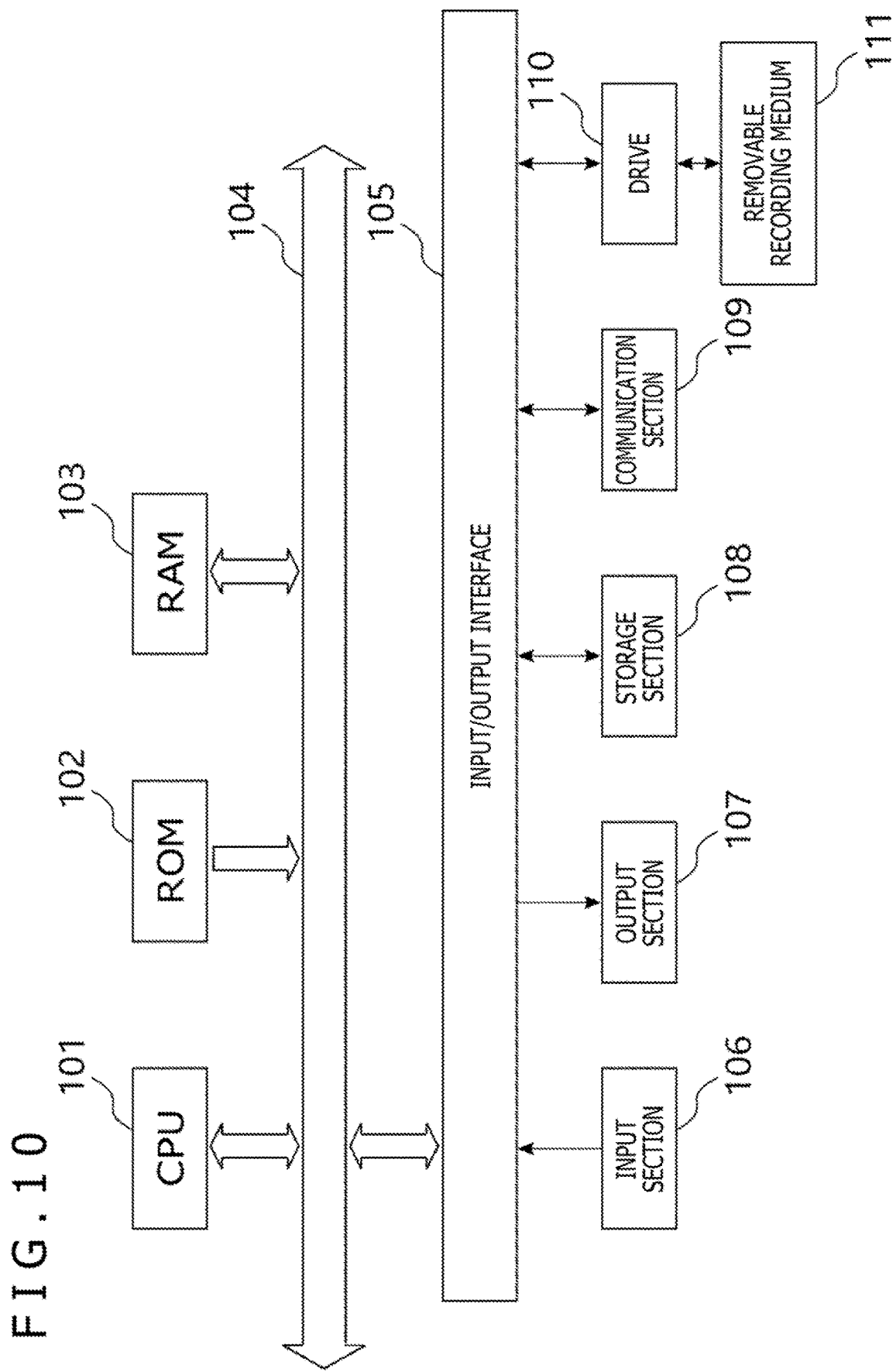

PROJECTOR, PROJECTOR CONTROL METHOD, AND IMAGE SYSTEM

TECHNICAL FIELD

The present technology relates to a projector, a projector control method, and an image system, and more particularly, to a projector, a projector control method, and an image system that make it possible to easily control operation performed by the projector.

BACKGROUND ART

In a case where a desired operation is intended to be performed at a predetermined time point by a projector, there is a method available, for example, for allowing a server connected to the projector through a network to exercise control (refer, for example, to PTL 1).

CITATION LIST

Patent Literature

[PTL 1]
JP 2010-231610 A

SUMMARY

Technical Problem

However, in a case where a server controls the operation of a projector, the server needs to monitor the operating state of the projector. Thus, the load on the server increases with an increase in the number of projectors to be controlled.

The present technology has been made in view of the above circumstances and makes it possible to easily control operation performed by the projector.

Solution to Problem

A projector according to a first aspect of the present technology includes a display control section which acquires display data including equipment control information that controls equipment, and which controls another equipment according to the equipment control information.

A projector control method according to a second aspect of the present technology includes acquiring display data including equipment control information that controls equipment, and controlling another equipment according to the equipment control information.

An image system according to a third aspect of the present technology includes a projector, and a server, in which the projector includes a display control section which acquires, from the server, display data including equipment control information that controls equipment, and which controls another equipment according to the equipment control information, and the server includes a storage section which stores the display data.

In the first to third aspects of the present technology, a projector acquires display data including equipment control information that controls equipment, and controls another equipment according to the equipment control information.

The projector may be an independent device or an internal block included in a device.

Advantageous Effect of Invention

According to the first to third aspects of the present technology, it is possible to easily control operation performed by the projector.

Note that the advantageous effect described here may not be limited, and the advantageous effect may be any of the advantageous effects described in the present disclosure.

BRIEF DESCRIPTION OF DRAWINGS

FIG. 3 is a functional block diagram illustrating a projector and a server.

FIG. 4 is a diagram illustrating an example of a setting screen for generating setting information.

FIG. 5 is a diagram illustrating an example of display data.

FIG. 8 is a diagram illustrating an example of a setting screen for setting a white list.

FIG. 9 is a flowchart illustrating an access control process.

FIG. 10 is a block diagram illustrating an example configuration of an embodiment of a computer to which the present technology is applied.

DESCRIPTION OF EMBODIMENT

The best mode for carrying out the present technology (hereinafter referred to as an embodiment) will now be described. The description will be given in the following order.

1. Example Configuration of Image System
2. Functional Block Diagram of Projector and Server
3. Example of Display Data
4. Server Data Display Process
5. Access Control Process
6. Example Computer Configuration <1. Example Configuration of Image System>

Figure 1:
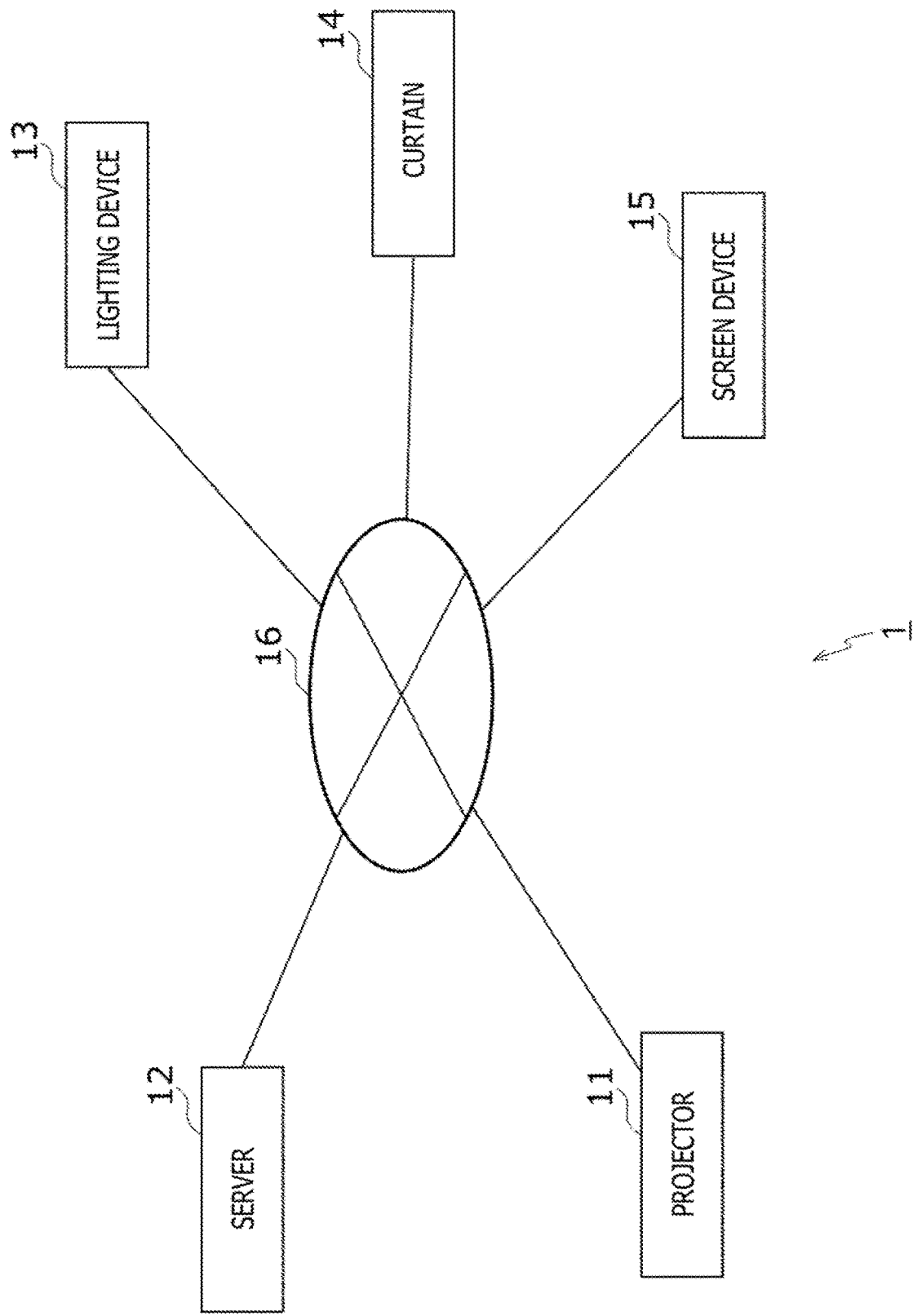
FIG. 1 is a diagram illustrating an example configuration of an embodiment of an image system to which the present technology is applied.

FIG. 1 illustrates an example configuration of an embodiment of an image system to which the present technology is applied.

The image system 1 depicted in FIG. 1 includes a projector 11, a server 12, a lighting device 13, a curtain 14, and a screen device 15. This system uses the projector 11 to display a predetermined image.

The projector 11, the server 12, the lighting device 13, the curtain 14, and the screen device 15 are interconnected through a predetermined network 16 such as a LAN (Local Area Network), a WAN (Wide Area Network), or the Internet, for example.

Figure 2:
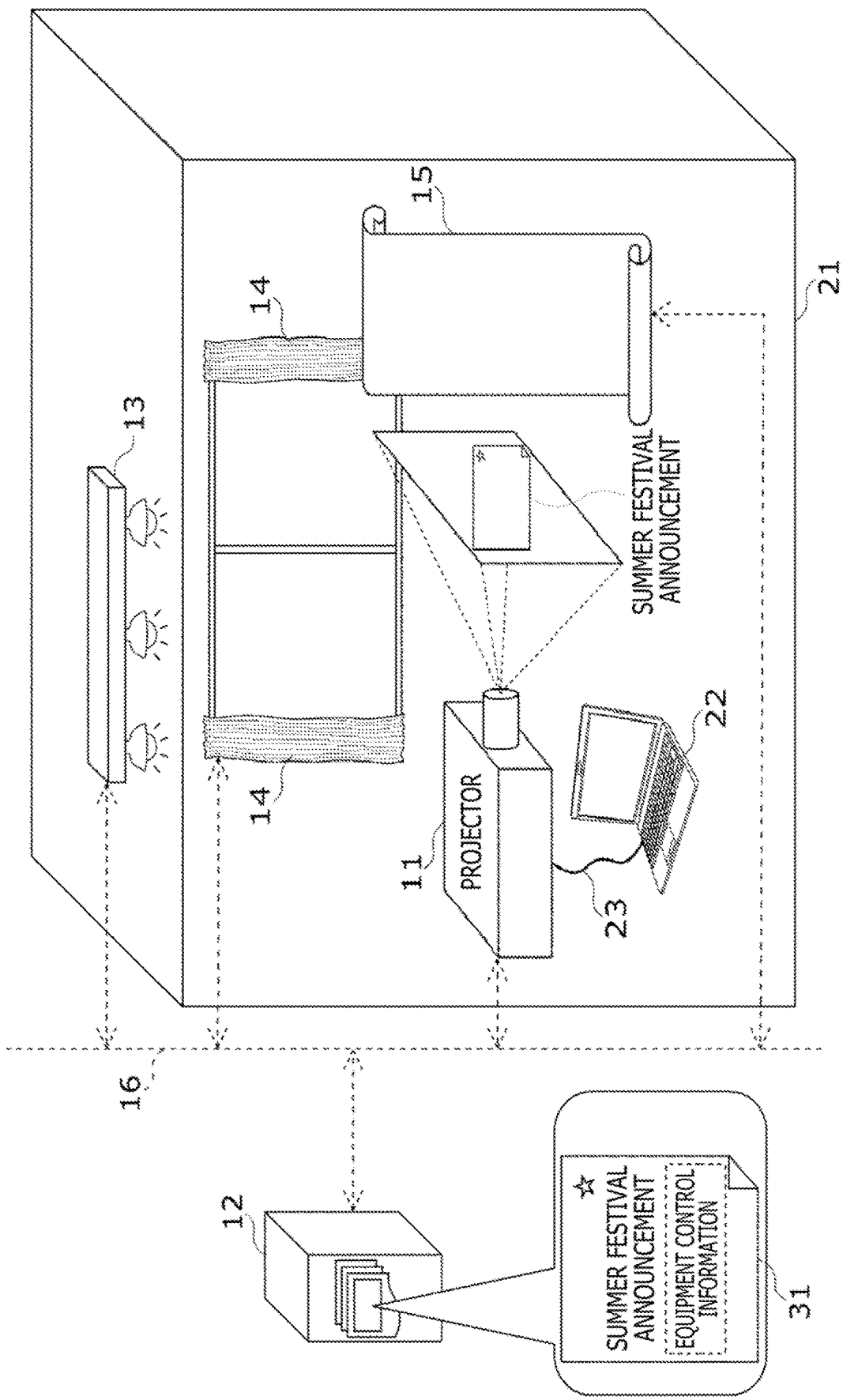
FIG. 2 is a diagram illustrating an example installation of various kinds of equipment in the image system.

FIG. 2 illustrates an example installation of the various kinds of equipment in the image system 1.

The projector 11, the lighting device 13, the curtain 14, and the screen device 15 are installed, for example, in a predetermined conference room 21 in a company. The server 12 is installed at a place different from the conference room 21.

For ease of explanation, the present embodiment is described on the assumption that one projector 11, one server 12, one lighting device 13, one curtain 14, and one screen device 15 are each connected to the network 16. However, the number of each piece of equipment to be connected to the network 16 is not limited. In other words, each piece of equipment may be connected in plural number to the network 16.

For example, in a case where the projector 11, the lighting device 13, the curtain 14, and the screen device 15 are installed in each of a plurality of conference rooms 21 and connected to the network 16, the image system 1 includes a plurality of projectors 11, a plurality of lighting devices 13, a plurality of curtains 14, a plurality of screen devices 15, and one server 12.

It should be noted that the image system 1 can exclude some of the lighting device 13, the curtain 14, and the screen device 15 or can include a microphone, a printer, and other kinds of equipment that are additionally connected to the network 16.

As depicted in FIG. 2, in a predetermined meeting held in the conference room 21, a user connects his/her personal computer 22 (hereinafter referred to as the PC 22) to the projector 11 with a communication cable 23 such as an HDMI (registered trademark) (High-Definition Multimedia Interface), and causes the projector 11 to project a presentation image prepared by the user. The projector 11 acquires presentation data from the PC 22 and displays (projects) the presentation image on a projection plane such as a wall or the screen of the screen device 15.

Further, at a preset time point, the projector 11 accesses the server 12 through the network 16, acquires display data 31 from the server 12, and displays an image based on the display data 31 on the projection plane such as the wall or the screen of the screen device 15. In the example of FIG. 2, the server 12 stores the display data 31 concerning a "SUMMER FESTIVAL ANNOUNCEMENT," and the projector 11 acquires the display data 31 from the server 12 and displays the "SUMMER FESTIVAL ANNOUNCEMENT" on the projection plane.

The display data 31 stored in the server 12 incorporates equipment control information that controls predetermined equipment connected to the network 16, and the projector 11 controls the predetermined equipment on the basis of the equipment control information incorporated in the display data 31. Specifically, on the basis of the display data 31, the projector 11 is able to not only display a predetermined image on the projection plane but also cause the predetermined equipment to perform a predetermined operation.

For example, it is on an assumption that a predetermined time point at which the server 12 is accessed and the display data 31 is acquired coincides with a time point at which the communication cable 23 connected to the PC 22 is disconnected from the projector 11 and that control information that turns off the lighting device 13, opening the curtain 14, and raising (storing) the screen of the screen device 15 is written as the equipment control information incorporated in the display data 31 to be acquired at the above time point.

In the above case, in a case in which the user disconnects the communication cable 23 from the projector 11 at the end of the meeting, the projector 11 acquires the display data 31 from the server 12 and executes the equipment control information to thereby turn off the lighting device 13, open the curtain 14, and raise the screen of the screen device 15. When viewed from the user, disconnecting, by the user, the communication cable 23 from the projector 11 automatically causes the lighting device 13 to turn off, the curtain 14 to open, and the screen of the screen device 15 to rise. This establishes an environment for exiting the conference room 21 without a particular user's operation.

In a case where the acquired display data 31 includes a command written for displaying an image presenting announcement information regarding a summer festival as depicted in FIG. 2, the information regarding the summer festival is displayed on the projection plane such as the wall. This enables the projection plane to display information that is to be delivered to a large number of users who use the conference room 21. In a case where there is no particular announcement information, for example, the logo of the company may be displayed.

The display data 31 may include data in which only the equipment control information is written or include both display control information and the equipment control information to be displayed on the projection plane. Further, as a matter of course, in a case where the equipment need not be controlled, the projector 11 can also perform only an operation for displaying an image on the projection plane.

As another example of the operation of the projector 11, it is on an assumption that a predetermined time point at which the server 12 is accessed and the display data 31 is acquired coincides with a time point at which the PC 22 is connected to the projector 11 with the communication cable 23 and that control information that turns off the lighting device 13, closes the curtain 14, and lowers the screen of the screen device 15 is incorporated as the equipment control information in the display data 31 to be acquired at the above time point.

In the above case, in a case in which the user connects the PC 22 to the projector 11 with the communication cable 23, the lighting device 13 turns off, the curtain 14 closes, and the screen of the screen device 15 lowers. This establishes an environment for displaying a presentation image in the conference room 21 without a particular user's operation. The equipment control information may be written so as to not only control the lighting device 13, the curtain 14, and the screen device 15, but also switch to an input terminal of the communication cable 23 for data input purposes.

<2. Functional Block Diagram of Projector and Server>

FIG. 3 is a functional block diagram illustrating the projector 11 and server 12 that perform the above-described process.

The projector 11 includes an input section 40, a communication section 41, an operation section 42, a projection section 43, a control section 44, and a storage section 45. Further, although not depicted in FIGS. 1 and 2, a remote controller 11R is attached to the projector 11.

The input section 40 includes one or more input terminals that are to be connected to a communication cable compliant with a predetermined standard such as the HDMI (registered trademark) or a USB (Universal Serial Bus). Image signals and control signals inputted through the input terminals are supplied to the control section 44.

The communication section 41 includes a network interface for establishing communication through the network 16 such as a LAN, a WAN, or the Internet. The communication section 41 communicates with another equipment under control of the control section 44. It should be noted that the communication section 41 may provide wired communication or wireless communication using Wi-Fi (trademark) or the like. Further, the communication section 41 may provide both wired communication and wireless communication.

The operation section 42 includes a plurality of operation buttons 51 disposed on the main body of the projector 11, receives a user operation on the operation buttons 51, and supplies an operation signal corresponding to the user operation to the control section 44. Further, the operation section 42 receives an operation signal that is transmitted from the remote controller 11R through wireless communication such as infrared rays, and then supplies the received operation signal to the control section 44.

The remote controller 11R includes operation buttons 52, receives a user operation on the operation buttons 52, and supplies an operation signal corresponding to the user operation to the operation section 42 through wireless communication such as infrared rays.

Either the operation buttons 51 or operation buttons 52 or both of them include, for example, a power button for turning power on and off, an input changeover button for changing the input section for an image signal to be projected, a setting button for displaying a setting screen of the projector 11, a direct button for designating an operation of acquiring the display data 31 directly from the server 12, and the like.

The projection section 43 includes, for example, an optical lens section, a liquid-crystal panel, and a light source and projects an image (displays an image on the projection plane) on the basis of an image signal to be supplied from the control section 44.

The control section 44 includes, for example, a CPU (Central Processing Unit), a RAM (Random Access Memory), and the like, reads an operation control program stored in the storage section 45, and controls the overall operation of the projector 11 according to the operation control program. For example, according to an operation signal to be supplied from the operation section 42, the control section 44 selects an input terminal to which an image signal to be projected is supplied, supplies the image signal to be inputted from the selected input terminal to the projection section 43, and causes the projection section 43 to project an image.

The control section 44 includes at least a communication control section 61 and a display control section 62. The communication control section 61 controls the communication section 41. The display control section 62 controls an image display (image projection) that is performed by the projection section 43.

The communication control section 61 controls the communication section 41 according to setting information 71 stored in the storage section 45, for example, and thus causes the communication section 41 to acquire the display data 31.

The display control section 62 acquires, for example, the display data 31 from the communication section 41, causes an image to be displayed on the basis of the acquired display data 31, and controls another equipment. Specifically, the display control section 62 causes the projection section 43 to display an image on the basis of the display data 31 acquired through the communication section 41. Further, the display control section 62 causes predetermined equipment to perform a predetermined operation on the basis of the equipment control information incorporated in the display data 31.

The display control section 62 analyzes and renders the display data 31 which is a web browser represented by Google Chrome (registered trademark), Opera (trademark), Firefox (registered trademark), and the like or which is a program having functions equivalent to those of the web browser and written in HTML (HyperText Markup Language), CSS (Cascading Style Sheets), JavaScript (registered trademark), or the like. In the display data 31, images to be displayed on the projection plane are written, for example, in HTML or CSS, and the equipment control information is written, for example, in JavaScript (registered trademark).

The storage section 45 includes, for example, a hard disk, a ROM (Read Only Memory), a RAM (Random Access Memory), or an NVRAM (Non Volatile RAM), and stores, for example, the operation control program for controlling the operation of the projector 11. Further, the storage section 45 stores the setting information 71 for setting, for example, time points and acquisition sources for acquiring the display data 31 stored in the server 12.

FIG. 4 illustrates an example of a setting screen for generating the setting information 71 that is to be stored in the storage section 45.

When, for example, the setting button for displaying the setting screen of the projector 11 is operated (pressed), the projection section 43 displays the setting screen depicted in FIG. 4 on the projection plane.

At each preselected time point, the setting screen makes it possible to set (register) an acquisition source for acquiring the display data 31 in a case where each preselected time point is reached.

The setting screen depicted in FIG. 4 makes it possible to set an acquisition source for acquiring the display data 31 at three kinds of time points, namely, a time point at which the HDMI (registered trademark) communication cable 23 is disconnected, a time point at which an operation is performed to select a browser input, for example, with the remote controller 11R, and a time point at which the direct button for acquiring the display data 31 directly from the server 12 is operated (pressed). The acquisition source for acquiring the display data 31 is specified by a URL (Uniform Resource Locator) or an IP address.

The example of FIG. 4 specifies that "http://www.server1/document1.html" should be acquired as the display data 31 when the communication cable 23 is disconnected. Further, the example specifies that "http://www.server1/document2.html" should be acquired when an operation for selecting a browser input is performed. Furthermore, the example specifies that "http://www.server2/document11.html" should be acquired when the direct button is operated (pressed).

When a register button is pressed, inputted information is stored in the storage section 45 as the setting information 71. A cancel button is pressed in a case where the inputted information is not updated as the setting information 71.

FIG. 4 illustrates an example of the setting screen. The setting screen can be configured such that other time points and acquisition sources for acquiring the display data 31 can be specified.

The acquisition source for acquiring the display data 31 may be specified by using a method other than using the setting screen. For example, the acquisition source may be specified, for example, from a personal computer connected through the communication cable 23 or the network 16 using a parameter along with a command for acquiring the display data 31.

Returning to the explanation of FIG. 3, the server 12 includes a communication section 81, a storage section 82, and a control section 83.

The communication section 81 includes a network interface for establishing communication through the network 16 such as a LAN, a WAN, or the Internet. The communication section 81 performs predetermined communication with another equipment according to control of the control section 83. It should be noted that the communication section 81 may provide wired communication or wireless communication using Wi-Fi (trademark) or the like. Further, the communication section 81 may provide both wired communication and wireless communication.

The storage section 82 includes, for example, a hard disk, a ROM, a RAM, an NVRAM, or the like and stores, for example, an operation control program for controlling the operation of the server 12. Further, the storage section 82 stores the display data 31 that is to be transmitted to the projector 11.

The control section 83 includes, for example, a CPU (Central Processing Unit), a RAM, and the like, reads the operation control program stored in the storage section 82, and controls the overall operation of the server 12 according to the operation control program. For example, the control section 83 receives a request for the display data 31 from the projector 11, controls the communication section 81 to transmit the display data 31 stored in the storage section 82 to the projector 11.

Further, the control section 83 causes the storage section 82 to store the display data 31 transmitted from a predetermined terminal (e.g., a personal computer) connected through the network 16 or to update (overwrite) such stored display data 31.

<3. Example of Display Data>

FIG. 5 illustrates an example of the display data 31 that is to be stored in the storage section 82.

The display data 31 depicted in FIG. 5 includes an HTML file. In the HTML file, descriptions given between a <body> tag and a </body> tag indicate the contents of a document.

Among the descriptions given between the <body> tag and the </body> tag, the description <img src="image.png"> in the first line displays an image. This description acquires an image file "image.png" and displays an image. The description <img src="image.png"> in the first line corresponds to image display control information that displays an image.

Descriptions given between a <script> tag and a </script> tag, which are below the <img> tag, are the descriptions as the equipment control information that controls equipment. The equipment control information includes an address that specifies control target equipment, and a command that specifies the operation to be performed by the control target equipment.

The description "type=text/javascript" in the <script> tag indicates that a script is written in JavaScript (registered trademark).

The next description "function control_other_system( )" defines (sets) a function that controls another equipment.

The next description "//Power ON control of another equipment" is a comment line and does not affect the operation.

The next description "var xhr=new XMLHttpRequest( );" is a command for creating an XMLHttpRequest object that is an object for requesting another equipment to exercise control.

The next description "xhr.onload=function( )" is a command for performing setup so as to execute the following three lines when a function is called.

The next description "var resp=xhr.responseText;" is a command for receiving a reply command. However, as the reply command is not involved in the present operation, the operation for receiving the reply command is not actually performed.

The next description "xhr.open('POST', 'othersystem_url/command/power_on');" is a command for specifying the location where the other equipment exists by the URL. In the present example, connection destination to the other equipment becomes "othersystem_url/command/power_on." The connection destination to the other equipment may be specified not only by a URL but also by an IP address. The control target equipment is identified by the URL or the IP address.

The next description "xhr.send(JSON.stringify({method: "power", version: '1.0', params: "on"}));" is a command that transmits a method parameter, a version parameter, and a params parameter. The method and params parameters specify the operation to be performed by equipment and correspond to a command that identifies the operation that is to be performed by the control target equipment. In the method parameter that is the first parameter, "power" is set. In the version parameter that is the second parameter, "1.0" is set, and in the params parameter that is the third parameter, "on" is set. This parameter specifies the operation for turning power on. The transmission destination of each of the above parameters is "othersystem_url/command/power_on."

For example, in a case where equipment that exists at a location specified by the URL "othersystem_url/command/power_on" is the lighting device 13, when the display control section 62 of the projector 11 acquires the display data 31 including the HTML file depicted in FIG. 5, the image "image.png" is displayed on the projection plane, and the lighting device 13 is turned on to illuminate the lighting device 13. The image "image.png" is, for example, an image for presenting announcement information regarding a summer festival as indicated in FIG. 2. Although the equipment control information concerning the curtain 14 and screen device 15 is not illustrated, the equipment control information that controls a plurality of pieces of equipment can be incorporated in the HTML file in a similar manner.

<4. Server Data Display Process>

A server data display process will now be described with reference to the flowchart of FIG. 6. The server data display process causes the projector 11 to acquire the display data 31 stored in the server 12, displays an image, and exercises equipment control. This process starts when, for example, the projector 11 is turned on.

First, in step S11, the display control section 62 reads the setting information 71 stored in the storage section 45, and determines whether a time point set by the setting information 71 for display data acquisition is reached. For example, if the information set from the setting screen depicted in FIG. 4 is stored in the storage section 45 as the setting information 71, the display control section 62 determines whether the communication cable 23 is disconnected, an operation for selecting a browser input is performed, or the direct button is pressed.

Step S11 is repeatedly performed until it is determined in step S11 that the time point for display data acquisition is reached.

In a case where it is determined in step S11 that the time point for display data acquisition is reached, that is, in a case where one of three different events, namely, the disconnection of the communication cable 23, the operation for selecting a browser input, and the press of the direct button, is generated, processing proceeds to step S12.

In step S12, according to the generated event, the display control section 62 accesses the server 12 which is specified by the setting information 71 and acquires the display data 31.

In step S13, according to the image display control information written in the display data 31, the display control section 62 supplies a predetermined image signal to the projection section 43, and causes the projection section 43 to project an image. The projection section 43 projects the image according to the image signal supplied from the display control section 62.

In step S14, according to the equipment control information written in the display data 31, the display control section 62 transmits a predetermined command to another equipment (control target equipment) connected through the network 16 to control the control target equipment. In a case where the equipment control information that controls a plurality of pieces of control target equipment connected through the network 16 is written in the display data 31, the command is transmitted to the plurality of pieces of control target equipment.

Upon completion of step S14, processing returns to step S11 and repeats steps S11 to S14 in the above-described manner. Specifically, in a case where it is determined whether or not a predetermined time point set by the setting information 71 is reached and then the predetermined time point is reached, processing is performed to acquire the display data 31, display an image, and control the equipment.

The server data display process is performed in the manner described above. The server data display process terminates when, for example, the projector 11 turns off.

The image system 1 depicted in FIG. 1 is such that the display data 31 incorporating the equipment control information that controls another equipment is stored in the server 12 connected to the projector 11 through the network 16. At a predetermined time point specified by the setting information 71, the projector 11 acquires the display data 31 from the server 12 and according to the acquired display data 31, displays (projects) an image and controls the other equipment.

The operation to be performed by the projector 11 at a predetermined time point can be controlled by using the display data 31. The projector 11 independently operates according to the acquired display data 31 and is able to control the other equipment as well because the equipment control information is incorporated in the display data 31.

For example, in a case where the projector 11 is engaged in a predetermined operation or put in a predetermined state while an operation state of the projector 11 is monitored by the server 12, the server 12 in the image system 1 does not need to constantly monitor the operating state of the projector 11 in contrast to a server-based control system in which the server 12 commands the projector 11 to perform a predetermined operation. For example, in a case where a plurality of projectors 11 installed one by one in each of a plurality of conference rooms is to be controlled according to the operating states and constantly monitored by the server 12, the load on the server 12 increases with an increase in the number of projectors 11 to be monitored. However, according to the image system 1 depicted in FIG. 1, even in a case where the operations of a number of projectors 11 are to be controlled, it is only sufficient that one piece of display data 31 is stored in the server 12.

Further, in a case where the operation to be performed by the projector 11 at a predetermined time point or the control of another equipment is to be changed, it is simply required that one piece of display data 31 stored in the server 12 be changed. Therefore, it is not necessary to perform correction work on each of the plurality of projectors 11.

Consequently, the image system 1 depicted in FIG. 1 makes it easy to control the operation to be performed by a projector.

The system configuration of the image system 1 described above has been described on the assumption that the control target equipment controlled by the projector 11 is equipment other than a projector. However, the control target equipment may be a projector.

Figure 7:
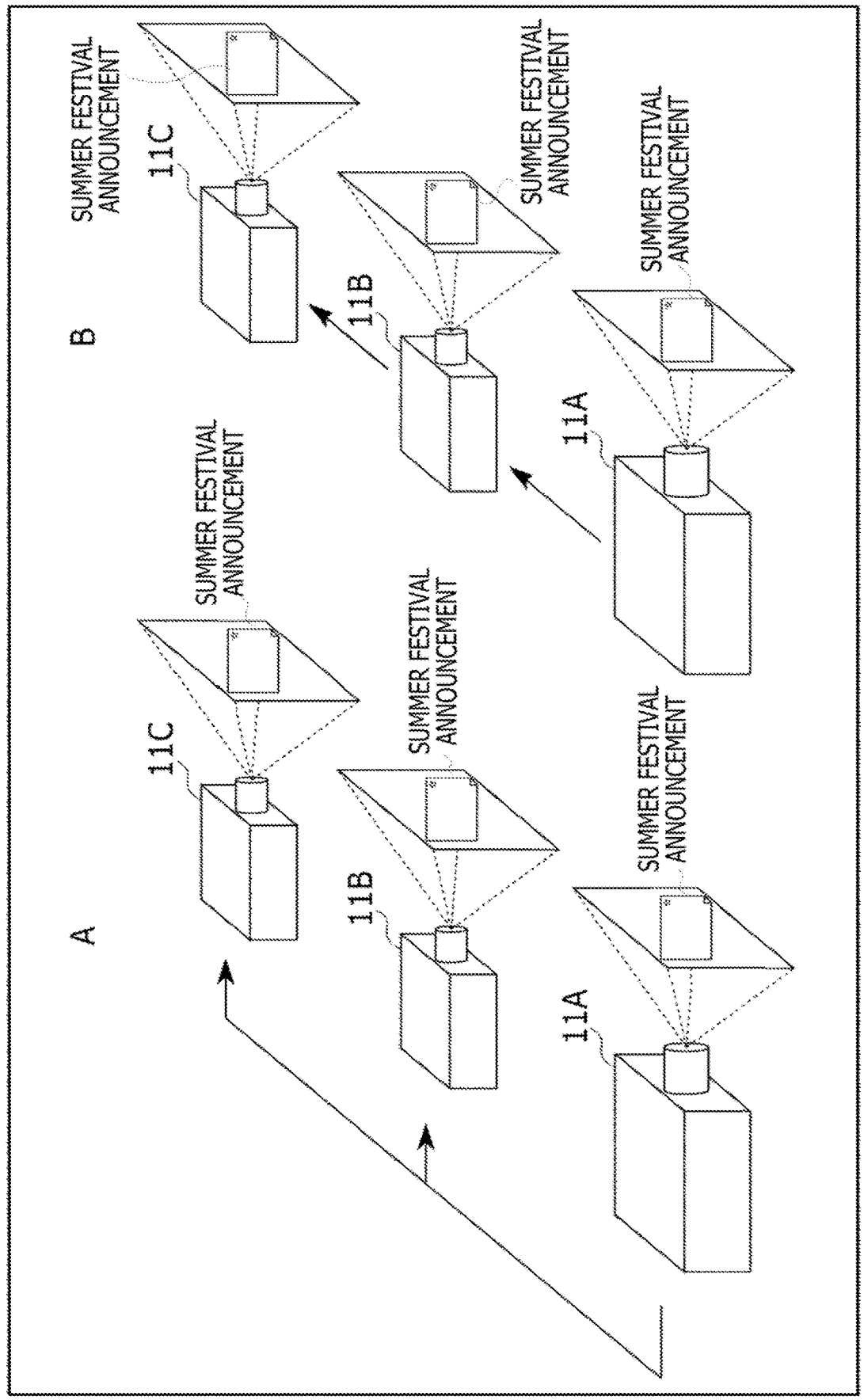
FIG. 7 depicts diagrams illustrating coordinated operations of a plurality of projectors.

For example, in a case where three projectors 11, namely, projectors 11A to 11C, are connected through the network 16 as depicted in FIG. 7, it is possible to implement a configuration in which the projector 11A which acts as a primary projector controls the projectors 11B and 11C which act as secondary projectors.

In the above case, two different configurations can be implemented. In a first configuration depicted in A of FIG. 7, the primary projector 11A parallelly controls the secondary projectors 11B and 11C. In a second configuration depicted in B of FIG. 7, the primary projector 11A controls the secondary projector 11B, and the secondary projector 11B which is controlled by the projector 11A controls the secondary projector 11C. The three projectors 11A to 11C may project images at the same place or at different places. Operating the plurality of projectors 11 in a coordinated manner by using the equipment control information incorporated in the display data 31 makes it possible to reduce the load on the server 12.

<5. Access Control Process>

Incidentally, as described with reference to FIG. 1 and the like, the projector 11 is connected through the network 16 to a plurality of pieces of equipment such as the server 12, the lighting device 13, and the curtain 14. In a case where the projector 11 is connected to individual user-managed equipment with the communication cable 23 or the like, security is not a significant concern. However, in an environment where a large number of equipment is connected through the network 16, it is possible that, for example, a malicious server may access the projector 11, and thus, reduction of security is concerned.

In view of the above circumstances, the storage section 45 of the projector 11 stores in advance, as part of the setting information 71, a white list that is a connection destination list indicative of equipment connectable to the projector 11, and the communication control section 61 controls the connection to another equipment by determining, according to the white list, whether or not the projector 11 is connectable to the other equipment. In other words, according to the white list, the communication control section 61 controls access to the other equipment, the access such as transmission or reception of commands and data to and from the other equipment.

More specifically, for example, in a case where the display control section 62 attempts to connect to the server 12 which is an acquisition source in order to acquire the display data 31, the communication control section 61 references the white list stored in the storage section 45 as part of the setting information 71, and determines whether or not the projector 11 is connectable to the server 12 which is a connection destination. In a case where the server 12 is registered in the white list, the communication control section 61 allows the display control section 62 to connect to the server 12. Meanwhile, in a case where the server 12 is not registered in the white list, the communication control section 61 does not allow the display control section 62 to connect to the server 12 and blocks such a connection attempt.

Further, in a case where, according to the acquired display data 31, the display control section 62 attempts to connect to the control target equipment such as the lighting device 13, the curtain 14, or the screen device 15, the communication control section 61 references the white list and determines whether or not the projector 11 is connectable to the control target equipment. In a case where the control target equipment is registered in the white list, the communication control section 61 allows the display control section 62 to connect to the control target equipment. Meanwhile, in a case where the control target equipment is not registered in the white list, the communication control section 61 does not allow the display control section 62 to connect to the control target equipment and blocks such a connection attempt.

Furthermore, for example, in a case where the projector 11 receives a request for connection from another equipment, the communication control section 61 references the white list and determines whether or not the projector 11 is connectable to the equipment that has requested for connection (hereinafter referred to as the connection requesting equipment). In a case where the connection requesting equipment is registered in the white list, the communication control section 61 permits the connection from the connection requesting equipment. Meanwhile, in a case where the connection requesting equipment is not registered in the white list, the communication control section 61 does not permit the connection from the connection requesting equipment and blocks such a connection attempt.

One or more pieces of equipment connectable to the projector 11 can be registered (set) by the user through use of a setting screen. A list of one or more pieces of registered equipment is stored in the storage section 45 as the white list.

FIG. 8 illustrates an example of the setting screen on which the user sets the white list.

"SETTING SCREEN 2" in FIG. 8 is a setting screen different from the setting screen that is depicted in FIG. 4 and used for setting the acquisition source of the display data 31.

The setting screen depicted in FIG. 8 includes a plurality of input fields into which URLs indicating one or more pieces of equipment connectable to the projector 11 are to be inputted. The user inputs (registers) the URL of predetermined equipment by operating the operation section 42 or the like. The operation section 42, the remote controller 11R, or the like functions as a registration section that registers the white list.

Instead of registering the white list through use of the setting screen depicted in FIG. 8, the white list may be registered by connecting a USB memory in which a file having the white list recorded therein is stored to the input section 40 of the projector 11 and allowing the input section 40 to read the file, for example.

Only a predetermined user may be allowed to register the white list.

It should be noted that the setting screen depicted in FIG. 8 has five input fields. However, the number of registerable pieces of equipment is not limited to five. Six or more pieces of equipment or four or fewer pieces of equipment may be registered. The location of the equipment connectable to the projector 11 which is to be inputted into the input fields may be specified by a URL or can be specified by an IP address.

When the register button is pressed, inputted information is stored in the storage section 45 as the setting information 71. The cancel button is pressed in a case where the inputted information is not updated as the setting information 71.

An access control process performed by the projector 11 will now be described with reference to the flowchart of FIG. 9. This process starts when, for example, the projector 11 is turned on.

First, in step S41, the communication control section 61 determines whether the display control section 62 connects to another equipment.

In a case where it is determined in step S41 that the display control section 62 connects to the other equipment, processing proceeds to step S42. In step S42, the communication control section 61 determines whether the connection destination is registered in the white list.

In a case where it is determined in step S42 that the connection destination is registered in the white list, processing proceeds to step S43. In step S43, the communication control section 61 allows the display control section 62 to access the connection destination. This enables the display control section 62 to connect to the server 12 and the control target equipment.

Meanwhile, in a case where it is determined in step S42 that the connection destination is not registered in the white list, processing proceeds to step S44. In step S44, the communication control section 61 blocks the display control section 62 from accessing the connection destination. Accordingly, the display control section 62 cannot connect to the equipment which is intended to be connected.

Meanwhile, in a case where it is determined in step S41 that the display control section 62 does not connect to another equipment, processing proceeds to step S45. In step S45, the communication control section 61 determines whether a request for connection is issued by the other equipment.

In a case where it is determined in step S45 that a request for connection is not issued by the other equipment, processing returns to step S41.

Meanwhile, in a case where it is determined in step S45 that a request for connection is issued by the other equipment, processing proceeds to step S46. In step S46, the communication control section 61 determines whether the connection requesting equipment is registered in the white list.

In a case where it is determined in step S46 that the connection requesting equipment is registered in the white list, processing proceeds to step S47. In step S47, the communication control section 61 allows access from the connection requesting equipment.

Meanwhile, in a case where it is determined in step S46 that the connection requesting equipment is not registered in the white list, processing proceeds to step S48. In step S48, the communication control section 61 blocks access from the connection requesting equipment.

After completion of step S43, S44, S47, or S48, processing returns to step S41 to perform steps S41 to S48 described above again. Consequently, a determination process according to the white list is repeatedly performed in a case where the projector 11 attempts to connect to another equipment connected to the network 16 and in a case where a request for connection is issued by the other equipment connected to the network 16.

As described above, the projector 11 causes the storage section 45 to store the white list which is the connection destination list indicative of pieces of equipment connectable to the projector 11 as part of the setting information 71 and controls equipment connected to the projector 11 according to the white list.

Consequently, the connection destination of the projector 11 can be limited to a predetermined range. This makes it possible to prevent access from a malicious server or the like and improve the security of the projector 11 to be connected to the network 16. As the above method creates the white list, that is, a list indicating pieces of equipment connectable to the corresponding projector 11 in a limited way, it is possible to ensure high security. Further, the above method is not a method in which the server or the like performs centralized management of the projector 11 connected thereto through a network. Therefore, security can be ensured with a simple system configuration.

Figure 6:
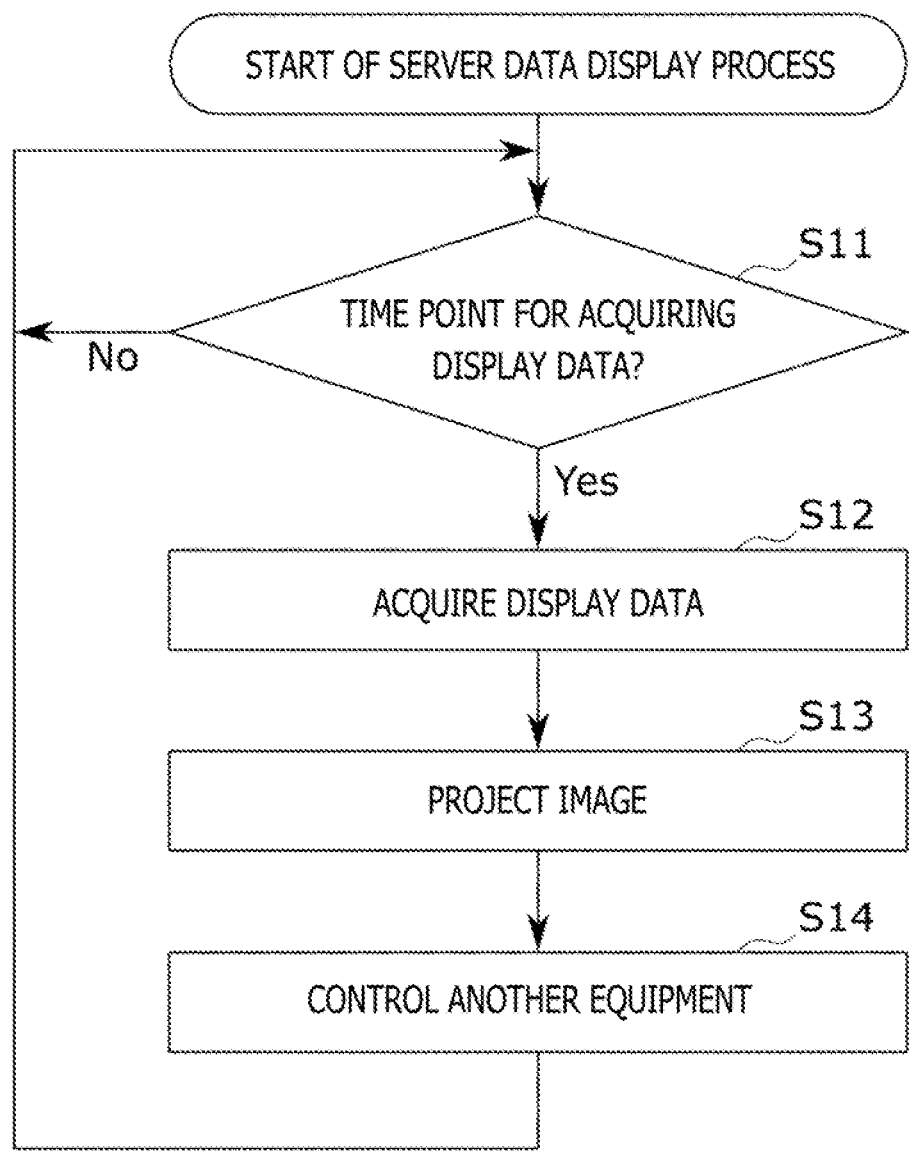
FIG. 6 is a flowchart illustrating a server data display process.

The access control process depicted in FIG. 9 is also executed when the server data display process described with reference to FIG. 6 is performed to acquire the display data 31 and connect to the control target equipment according to the equipment control information incorporated in the acquired display data 31. Therefore, the access control process also verifies connectability to equipment such as the control target equipment (e.g., lighting device 13) to which a command is to be transmitted and a server (e.g., server 12) regarded as the acquisition source for acquiring the display data 31. This makes it possible, for example, to restrict the projection (display) of an image transmitted from equipment which does not manage copyright or the like. Further, it is possible to block remote control from unexpected equipment.

The foregoing embodiment has been described with reference to examples in which the projector 11 connected to the network 16 actively controls another equipment (control target equipment) according to acquired display data 31 and controls equipment connected to the projector 11 according to the white list.

However, the present technology is applicable not only to the projector 11, but also to various other kinds of display equipment such as television receivers, and content recording/reproducing devices or display control equipment, and electronic equipment such as imaging devices and surveillance cameras.

<6. Example Computer Configuration>

The above-described processes performed by the projector 11 can be executed by hardware or by software. In a case where the above-described processes performed by the projector 11 is to be executed by software, programs constituting the processes are installed in a computer. In this instance, the computer includes a microcomputer incorporated in dedicated hardware or a general-purpose personal computer or the like, for example, capable of performing various functions by installing various programs in the computer.

FIG. 10 is a block diagram illustrating an example hardware configuration of a computer that executes programs to perform the above-described processes of the projector 11.

In the computer, a CPU (Central Processing Unit) 101, a ROM (Read Only Memory) 102, and a RAM (Random Access Memory) 103 are interconnected by a bus 104.

An input/output interface 105 is further connected to the bus 104. An input section 106, an output section 107, a storage section 108, a communication section 109, and a drive 110 are connected to the input/output interface 105.

The input section 106 includes, for example, an operation button, a keyboard, a mouse, a microphone, a touch panel, and an input terminal. The output section 107 includes, for example, a display, a speaker, and an output terminal. The storage section 108 includes, for example, a hard disk, a RAM disk, and a nonvolatile memory. The communication section 109 includes, for example, a network interface. The drive 110 drives a removable recording medium 111 such as a magnetic disk, an optical disk, a magneto-optical disk, or a semiconductor memory.

The computer configured as described above performs the above-described series of processes by allowing the CPU 101 to load a program stored, for example, in the storage section 108 into the RAM 103 through the input/output interface 105 and the bus 104, and execute the loaded program. Additionally, the RAM 103 also stores, as needed, for example, data necessary for the CPU 101 to perform various processes.

The programs to be executed by the computer (CPU 101) may be recorded and supplied on the removable recording medium 111 which is formed as a package medium or the like, for example. Further, the programs can be supplied through a wired or wireless transmission medium such as a local area network, the Internet, or a digital satellite broadcasting system.

In the computer, the programs can be installed in the storage section 108 through the input/output interface 105 when the removable recording medium 111 is loaded into the drive 110. Further, the programs can be received by the communication section 109 through a wired or wireless transmission medium and installed in the storage section 108. Moreover, the program can be preinstalled in the ROM 102 or the storage section 108.

It should be noted that the programs to be executed by the computer may perform processing in a chronological order described in this specification or perform processing in a parallel manner or at a required time point in response to a call, for example.

Additionally, the steps described in the flowcharts in this specification may obviously be performed in the described chronological order. However, the described steps need not always be performed in a chronological order, and may be performed in a parallel manner or at a required time point in response to a call, for example.

The term "system" used in this specification denotes an aggregate of a plurality of component elements (e.g., devices and modules (parts)), and whether or not all the component elements are within the same housing does not matter. Therefore, the term "system" denotes not only a plurality of devices accommodated in separate housings and connected to one another through a network, but also a single device including a plurality of modules accommodated in a single housing.

The embodiment of the present technology is not limited to the above-described embodiment and can be variously modified without departing from the gist of the present technology.

For example, all or some of the above-described embodiments can be combined as appropriate.

For example, the present technology can be configured for cloud computing in which one function is shared by a plurality of devices through a network in order to perform processing in a collaborative manner.

Further, each step described with reference to the foregoing flowcharts can be not only performed by a single device but also performed in a shared manner by a plurality of devices.

Moreover, in a case where a plurality of processes is included in a single step, the plurality of processes included in such a single step can be not only performed by a single device but also performed in a shared manner by a plurality of devices.

Note that the advantageous effects described in the present specification are illustrative only and the advantageous effects are not limited. There may also be advantageous effects other than those described in the present specification.

It should be noted that the present technology can also adopt the following configurations.

(1)

A projector including:

a display control section which acquires display data including equipment control information that controls equipment, and which controls another equipment according to the equipment control information.

(2)

The projector according to (1) above, in which the display control section acquires the display data from a server to be connected through a network.

(3)

The projector according to (1) or (2) above, in which the equipment control information includes an address that identifies the other equipment and a command that identifies operation of the other equipment, and the display control section transmits the command to the address.

(4)

The projector according to (3) above, in which the address is specified by a URL or an IP address.

(5)

The projector according to any one of (1) to (4) above, in which, at a predetermined time point stored in a storage section, the display control section acquires the display data and controls the other equipment.

(6)

The projector according to (5) above, in which the predetermined time point includes a time point at which the projector is disconnected from a predetermined device.

(7)

The projector according to (5) above, in which the predetermined time point includes a time point at which a user operation that acquires the display data is detected.

(8)

The projector according to any one of (1) to (7) above, further including:

a storage section which stores an acquisition source of the display data, in which the display control section accesses the acquisition source stored in the storage section and acquires the display data.

(9)

The projector according to any one of (1) to (8) above, in which the display control section includes a browser.

(10)

A projector control method including:

acquiring display data including equipment control information that controls equipment; and controlling another equipment according to the equipment control information.

(11)

An image system including:

a projector; and a server;

in which the projector includes a display control section which acquires, from the server, display data including equipment control information that controls equipment, and which controls another equipment according to the equipment control information, and the server includes a storage section which stores the display data.

REFERENCE SIGNS LIST

1 Image system, 11 Projector, 12 Server, 13 Lighting device, 14 Curtain, 15 Screen device, 16 Network, 23 Communication cable, 31 Display data, 40 Input section, 41 Communication section, 42 Operation section, 43 Projection section, 44 Control section, 45 Storage section, 61 Communication control section, 62 Display control section, 71 Setting information, 101 CPU, 102 ROM, 103 RAM, 106 Input section, 107 Output section, 108 Storage section, 109 Communication section, 110 Drive

The invention claimed is:

1. A projector, comprising:

a storage configured to store setting information that includes one or more time points, and one or more pieces of acquisition source information respectively associated with the one or more time points, the one or more time points corresponding to respective one or more user operations detectable by the projector; and processing circuitry configured to in response to one of the one or more user operations being detected by the projector, acquire display data from a server device according to one of the one or more pieces of acquisition source information associated with one of the one or more time points that corresponds to the one of the one or more user operations, the display data including equipment control information, and control a target device according to the equipment control information.

2. The projector according to claim 1, wherein the processing circuitry is configured to acquire the display data from the server device that is communicatively coupled with the projector through a network.

3. The projector according to claim 1, wherein the equipment control information includes an address that identifies the target device that is communicatively coupled with the projector through a network, and a command that identifies an operation of the target device, and the processing circuitry is configured to transmit the command to the address.

4. The projector according to claim 3, wherein the address is specified by a Uniform Resource Locator (URL) or an Internet Protocol (IP) address.

5. The projector according to claim 1, wherein the one or more user operations include a connection between a computational device and the projector via a predetermined communication interface being disconnected.

6. The projector according to claim 1, wherein the one or more user operations include supply of a user operation signal that instructs the projector to acquire the display data.

7. The projector according to claim 1, wherein processing circuitry is configured to render a browser, and the one or more user operations include a user selection of a browser input of the browser.

8. A projector control method, comprising:

storing, in a storage of a projector, setting information that includes one or more time points, and one or more pieces of acquisition source information respectively associated with the one or more time points, the one or more time points corresponding to respective one or more user operations detectable by the projector; and in response to one of the one or more user operations being detected by the projector, acquiring, by processing circuitry of the projector, display data from a server device according to one of the one or more pieces of acquisition source information associated with one of the one or more time points that corresponds to the one of the one or more user operations, the display data including equipment control information, and controlling, by the processing circuitry of the projector, a target device according to the equipment control information.

9. An image system, comprising:

a server device that includes a server storage configured to store one or more pieces of display data; and a projector communicatively coupled with the server device, the projector includes:

a projector storage configured to store setting information that includes one or more time points, and one or more pieces of acquisition source information respectively associated with the one or more time points, the one or more time points corresponding to respective one or more user operations detectable by the projector; and processing circuitry configured to in response to one of the one or more user operations being detected by the projector, acquire one of the one or more pieces of display data from the server device according to one of the one or more pieces of acquisition source information associated with one of the one or more time points that corresponds to the one of the one or more user operations, the one of the one or more pieces of display data including equipment control information, and control a target device according to the equipment control information.

10. The projector control method according to claim 8, wherein the one or more user operations include one or more of a connection between a computational device and the projector via a predetermined communication interface being disconnected, supply of a user operation signal that instructs the projector to acquire the display data, or a user selection of a browser input of a browser that is rendered by the processing circuitry of the projector.

11. The projector control method according to claim 8, wherein the equipment control information includes an address that identifies the target device that is communicatively coupled with the projector through a network, and a command that identifies an operation of target device.

12. The image system according to claim 9, herein the one or more user operations include one or more of a connection between a computational device and the projector via a predetermined communication interface being disconnected, supply of a user operation signal that instructs the projector to acquire the one of the one or more pieces of display data, or a user selection of a browser input of a browser that is rendered by the processing circuitry of the projector.

13. The image system according to claim 9, wherein the equipment control information includes an address that identifies the target device that is communicatively coupled with t projector through a network, and a command that identifies an operation of the target device.

* * * * *